(12) United States Patent
Rings et al.

(10) Patent No.: US 12,319,226 B2
(45) Date of Patent: Jun. 3, 2025

(54) BELT RETRACTOR UNIT AND VEHICLE HAVING SUCH A BELT RETRACTOR UNIT

(71) Applicant: Autoliv Development AB, Vargarda (SE)

(72) Inventors: Philip Rings, Norderstedt (DE); Martin Pawlowski, Münsterdorf (DE); Heiko Hinrichs, Welmbüttel (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 18/548,457

(22) PCT Filed: Feb. 24, 2022

(86) PCT No.: PCT/EP2022/054640
§ 371 (c)(1),
(2) Date: Aug. 30, 2023

(87) PCT Pub. No.: WO2022/184541
PCT Pub. Date: Sep. 9, 2022

(65) Prior Publication Data
US 2024/0140355 A1    May 2, 2024

(30) Foreign Application Priority Data

Mar. 4, 2021   (DE) .................... 10 2021 105 277.7

(51) Int. Cl.
| | | |
|---|---|---|
| *B60R 22/343* | (2006.01) | |
| *B60R 22/40* | (2006.01) | |
| *B60R 22/48* | (2006.01) | |

(52) U.S. Cl.
CPC ............ *B60R 22/343* (2013.01); *B60R 22/40* (2013.01); *B60R 22/48* (2013.01); *B60R 2022/4808* (2013.01)

(58) Field of Classification Search
CPC ....... B60R 22/343; B60R 22/40; B60R 22/48; B60R 2022/4808
See application file for complete search history.

(56) References Cited

U.S. PATENT DOCUMENTS 9,499,116 B2 * 11/2016 Tada ................. B60R 21/01542
2004/0056471 A1   3/2004 Bullinger et al.
(Continued)

FOREIGN PATENT DOCUMENTS

| DE | 102005035850 A1 | 2/2007 |
| GB | 2398824 B | 9/2005 |
| WO | 2004065184 A1 | 8/2004 |

*Primary Examiner* — Jason D Shanske
*Assistant Examiner* — Matthew James O'Neill
(74) *Attorney, Agent, or Firm* — DICKINSON WRIGHT PLLC

(57) ABSTRACT

A belt retractor unit with a housing, a rotatably mounted belt reel, a blocking unit for blocking the belt reel, wherein the blocking unit has an electrically controllable actuator unit, a control apparatus for controlling the actuator unit, which has a sensor apparatus for measuring at least one horizontal acceleration value and a switching apparatus for controlling the actuator unit in dependence on at least the at least one horizontal acceleration value, wherein the belt retractor unit has a first emergency state, in which the magnitude of the horizontal acceleration value is above a first limit value and in which the belt reel is blocked, and an unblocking state in which the magnitude of the horizontal acceleration value is below the first limit value.

6 Claims, 5 Drawing Sheets

(56) References Cited

U.S. PATENT DOCUMENTS

| | | |
|---|---|---|
| 2004/0089758 A1 | 5/2004 | Bullinger et al. |
| 2005/0107932 A1* | 5/2005 | Bolz .................. B60R 22/48 |
| | | 701/45 |
| 2006/0097505 A1 | 5/2006 | Midorikawa |
| 2007/0158488 A1 | 7/2007 | Bogenrieder et al. |
| 2011/0017857 A1* | 1/2011 | Odate .................. B60R 22/46 |
| | | 701/45 |
| 2018/0043858 A1* | 2/2018 | Bosse .................. B60R 22/405 |

* cited by examiner

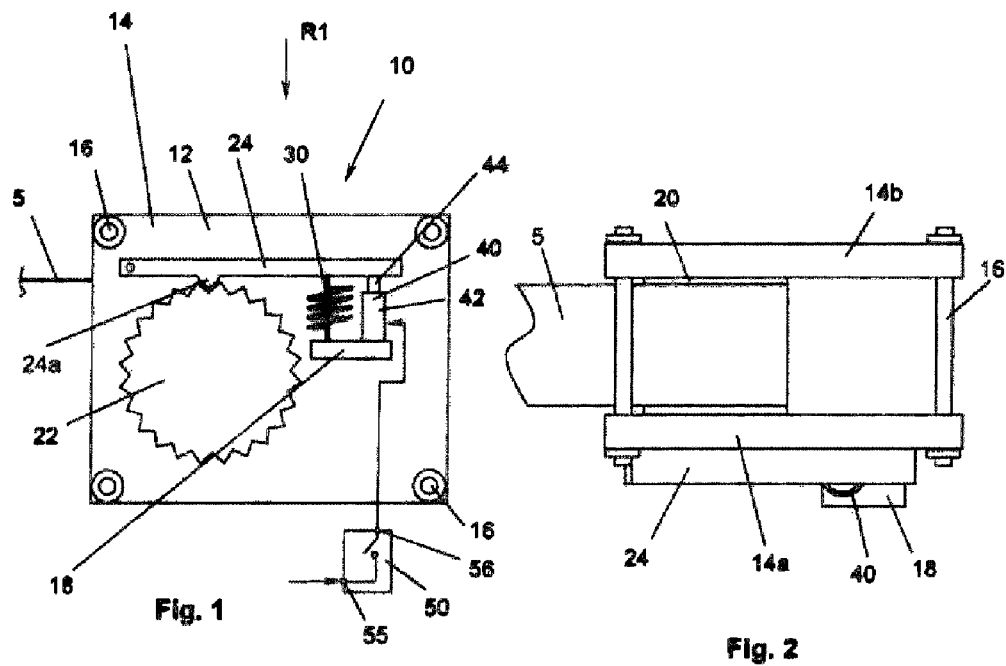
Fig. 1
Fig. 2
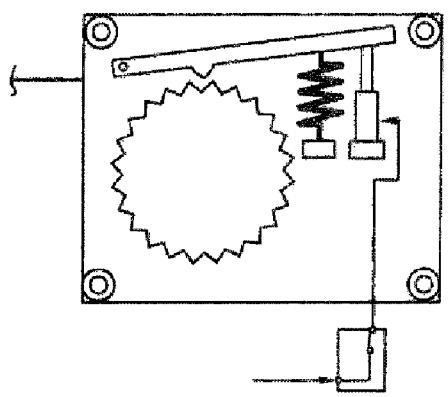
Fig. 3

$d^2X/dt^2 \neq 0$ ; $|a_{XY}| > 0$ $d^2Y/dt^2 \neq 0$ ; $|a_{XY}| > 0$ $\Delta Z \neq 0$ ; $|\Delta Z| > 0$ $\Delta Z \neq 0 \; ; \; |\Delta Z| > 0$

BELT RETRACTOR UNIT AND VEHICLE HAVING SUCH A BELT RETRACTOR UNIT

CROSS-REFERENCE TO RELATED APPLICATIONS

This application is a 35 U.S.C. § 371 national phase of PCT International Application No. PCT/EP2022/054640, filed Feb. 24, 2022, which claims the benefit of priority under 35 U.S.C. § 119 to German Patent Application No. 10 2021 105 277.7, filed Mar. 4, 2021, the contents of which are incorporated herein by reference in its entirety.

FIELD

The invention relates to a belt retractor unit according to the preamble of claim 1.

BACKGROUND

Every modern passenger car, but also most trucks, buses and the like have seat belt systems. Such a safety belt system always has a belt retractor unit, which in turn has a belt retractor with a housing and a belt reel rotatably mounted in this housing. A part of the safety belt system strap is wound on this belt reel and the user can unwind it from the belt reel against the force of a return spring acting between the belt reel and the housing. A blocking apparatus is further provided which has a release state in which the belt spool is not blocked against the housing and a blocking state in which the belt spool is blocked against the housing. This blocking apparatus usually has two independent sensors, namely a belt-sensitive sensor, which senses the rotation of the belt reel, and a vehicle-sensitive sensor, which senses the vehicle position and/or the vehicle acceleration (in particular the negative vehicle acceleration, i.e. deceleration). In normal driving conditions, i.e., when the strap is not extended too quickly and the vehicle is not in an unusual layer or experiencing unusual acceleration, the blocking apparatus is in its unblocked state and the user can extend the strap, allowing relatively free movement. However, if the strap is extended too quickly and/or the vehicle decelerates too quickly, for example, and/or the vehicle tilts too much out of its normal orientation, the blocking apparatus goes into its blocked state.

Currently, the blocking apparatuses are mostly completely mechanically designed, which means that the complete blocking apparatus (including the sensors) is rigidly connected to the housing of the belt retractor. However, this rigid connection of the entire blocking apparatus to the housing has disadvantages, particularly if the belt retractor unit is fastened to the vehicle seat, in particular its backrest, since in this case the position of the belt retractor and thus also of the vehicle-sensitive sensor can change relative to the vehicle.

For this reason, belt retractor units that operate completely or partially electrically have become known, the blocking apparatus of which has a blocking unit connected to the housing with an electromagnet and a control apparatus for controlling the electromagnet. This electromagnet is part of an electrically controllable actuator unit in such a way that the state of the actuator unit (particularly currentless or current-carrying) determines the state of the blocking unit (belt coil rotatable or belt coil blocked). Normally, the blocking unit also has a return element (usually in the form of a spring) that counteracts the electromagnet. This reset element can be part of the actuator unit. For safety reasons (fail safe), the currentless state is usually the blocked state (emergency state) and the energized state is the unlocked state (enable state). Accordingly, the control apparatus driving the actuator unit, which has a power input connected to the vehicle electrical system and a power output connected to the electromagnet, has a passive switching state in which the power supply from the power input to the power output is interrupted, and an active switching state in which the power input is connected to the power output and therefore current flows through the electromagnet. This control apparatus, which is generally coupled to the blocking unit exclusively electrically, can in this case be arranged in any location on the vehicle, in particular in such a manner that it does not move with the backrest. The control apparatus has at least one sensor apparatus and a switching apparatus for controlling the actuator unit as a function of the data supplied by the sensor apparatus. The control apparatus can form a structural unit, but does not have to.

The most important criterion for the transition from the enable state to the emergency state is that the magnitude of at least one horizontal acceleration value exceeds a limit value. It is often not necessary to distinguish between accelerations in the longitudinal direction of the vehicle (X-direction) and the transverse direction of the vehicle (Y-direction) and only the magnitude of the acceleration in the XY-plane is considered.

A generic belt retractor unit with such a blocking unit and such a control apparatus is described, for example, in GB 23 98 824 B. Such electrically operating belt retractor units have other advantages as they offer more possibilities to control the state of the belt retractor unit (blocked/not blocked).

SUMMARY

Based on this, the object of the present invention is to further improve a generic belt retractor unit.

This object is solved by a belt retractor unit having the features of claim 1.

In order to protect the occupant as well as possible, it is usually advisable for the seat belt locking system to be activated at an early stage, in particular even before the actual accident takes place, for example when the vehicle decelerates sharply. For this purpose, the limit value of the amount of horizontal acceleration above which the webbing locking starts should be relatively low. However, this has the consequence that, at least in some requirement profiles, the belt retractor unit relatively often switches to its blocked state (also referred to as the emergency state in the following), although there is no danger at all, i.e. the blocking of the belt reel is unnecessary as a result and is then also removed again. This is not a big deal in itself and is accepted in favor of the overall improvement in occupant safety.

However, it has been found that if the limit value preferred for vehicle occupant safety is selected (i.e., a low limit value), particularly in poor road conditions, the case can arise that the belt blocking system switches to its emergency state, in which the belt reel is blocked against the housing, simply due to jolting movements of the vehicle. Even this is not problematic in itself. However, it has also been found that, particularly in the case just described, the problem can often arise that the acceleration forces acting on the vehicle (and thus also on the sensor direction) frequently oscillate around the selected limit value in poor road conditions, so that the belt retractor unit then switches back and forth relatively frequently—and also with high frequency-between the emergency state and the release state. On the one hand, this is associated with disturbing noise development and also leads to increased wear of the mechanical components involved. Both are, of course, undesirable: the increased noise has a negative impact on comfort; all the more so as it is a particular advantage of generic seat belt retractor units that the housing of the retractor unit is arranged in the seat back and thus often close to an ear of the occupant. The increased wear is of course already disadvantageous because the life expectancy of a belt retractor unit should be designed to match the life expectancy of the entire vehicle.

In order to solve the problem just described, the controlling of the actuator unit by the control apparatus is carried out in the manner of a hysteresis, namely in such a way that there are two mutually different limit values for the amount of horizontal acceleration, namely a first limit value at which the blocking unit changes from its release state to the emergency state—hereinafter: first emergency state—and a second limit value at which the belt retractor unit returns from its first emergency state to the release state, wherein this second limit value is smaller in amount than the first limit value. This prevents constant switching back and forth by keeping the belt retractor unit in the emergency state for longer in appropriate situations—particularly in appropriate road conditions. Overall, this is much more convenient for the user than permanently switching back and forth between the emergency state and the enable state. Of course, this also reduces the number of switching cycles, which has a positive effect on the service life of the belt retractor unit.

What has just been described can be further improved in that the belt retractor unit, starting from its emergency state, only switches to the release state when the magnitude of the at least one horizontal acceleration value remains below a third limit value for a predetermined period of time, which may be at least 500 ms, for example, after it has fallen below the second limit value. This third limit value is preferably between the second and the first limit value and can in particular also be identical to the first limit value.

As this has already been mentioned, the blocking of the belt retractor unit must occur both when a sufficient acceleration occurs (which is mostly a negative acceleration, i.e. a deceleration) and when the vehicle tilts around its longitudinal or its transverse axis by more than a predetermined value. With such a tilt, the Z-axis of the vehicle always tilts against the vertical, so that one can describe the measure of the tilt by a single angle. A single classical mechanical sensor cannot distinguish between these two cases. The situation is different when using an electronic sensor: here, a distinction can be made between acceleration and inclination. Since it is obviously important that the belt retractor unit changes from the enable state to an emergency state both when an acceleration limit value is exceeded and when a tilt limit value is exceeded, the sensor should measure both values. Preferably, however, these values are processed separately by the switching apparatus, namely in such a manner that the inclination against the vertical axis is not taken into account when determining the first emergency state. This can reduce the number of unnecessary transitions from the enable state to the first emergency state, particularly on rough roads, since it has been found that the effect of rough roads on acceleration in the XY plane is often relatively small, but the effect on vehicle tilt, particularly about the X axis, is often relatively large.

To compensate for the non-consideration of the inclination about the vertical axis when determining the first emergency state, the belt retractor unit preferably has a second emergency state in which the belt reel is also blocked against the housing and which depends exclusively on the inclination.

BRIEF DESCRIPTION OF THE DRAWINGS

The invention will now be explained in more detail by means of a preferred embodiment with reference to the figures. In the figures:

FIG. 1 shows a schematic representation of a belt retractor unit, wherein the belt retractor of this belt retractor unit is shown in a schematic side view, wherein the control apparatus is in an open switching state and wherein the belt retractor is in its locked state, FIG. 2 shows a schematic top view of the belt retractor shown in FIG. 1 from direction R1, FIG. 3 shows the control apparatus as shown in FIG. 1, wherein the control apparatus is in its closed switching state and the belt retractor is in its unlocked state.

DETAILED DESCRIPTION

Figure 4A:
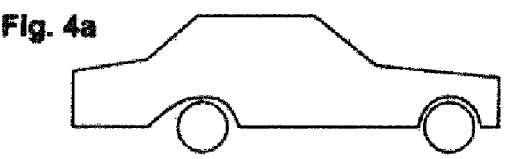
FIG. 4a shows a side view of a car and the corresponding coordinates.
Figure 4A:
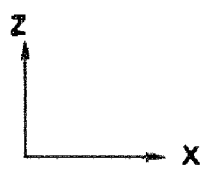

With reference to FIGS. 1 and 2, the essential features of a belt retractor unit according to the invention are first described. It should be noted here that the representations are very schematic and represent only the basic principles of the invention. The belt retractor unit may be considered to comprise the belt retractor 10 and the control apparatus 50. Here, the control apparatus 50 could be directly connected to the housing of the belt retractor 10, but need not be, which is why it is also represented as being remote from the housing in FIGS. 1 and 3. Of course, the control apparatus and belt retractor must be electrically connected to each other.

In the following, electrical conduits are represented only schematically (and not with outgoing and return conductors). Here, power lines are shown as solid lines and signal lines as lines with the pattern "dash-double-dot dash".

The belt retractor 10 comprises, as usual, a housing 10, a belt reel 20 rotatably supported in the housing, on which a portion of a strap 5 is wound, and a blocking unit for blocking the belt reel 20 in the housing 12. In the embodiment shown, the housing 12 has two housing plates 14a, 14b connected by connecting bolts 16, but this is to be understood as exemplary only. As a rule, and this is also shown here, the blocking unit has a locking wheel 22 connected in a rotationally fixed manner to the belt reel 20. A locking pawl 24a is also provided, which locks the locking wheel 22 and thus the belt spool 20 against the housing 12 in the locking state (emergency state) (FIG. 1), but not in the release state (FIG. 3).

Significantly, the position of the pawl 24a is controlled directly (as shown) or indirectly by an actuator assembly 40 having an electromagnet 42. In the embodiment shown, this influence is provided by the fact that the actuator unit 40 has, in addition to the electromagnet 42, a plunger 44 driven by the electromagnet, which acts on a lever 24 carrying the pawl 24a. When a sufficiently strong current flows through the electromagnet, it pushes the plunger 44 outward. As already mentioned, however, it should be noted that this construction is only to be understood as exemplary. Essentially, the blocking unit has an electromagnet such that the actuator unit controls the blocking unit depending on the current flow through the magnet. Usually, and this is also represented, a spring, in this case a tension spring 30, or another elastic element is provided which uniquely defines the state of the blocking unit when the electromagnet 42 of the actuator unit 40 is currentless and thus does not exert any force on the plunger driven by it. This currentless state is the locked state, as also represented in the figures.

Such electrically controlled blocking units with an electromagnet are known in the prior art. The invention therefore also relates exclusively to the controlling of the electromagnet, i.e. the control apparatus 50.

Figure 4B:
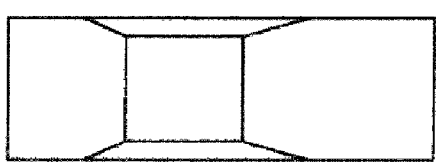
FIG. 4b shows a top view of the car from FIG. 4a and the corresponding coordinates.
Figure 4B:
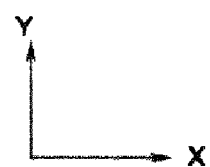
Figure 4C:
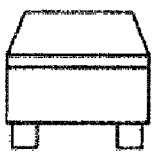
FIG. 4c shows a top view of the car from FIG. 4a from behind and the corresponding coordinates.
Figure 4C:
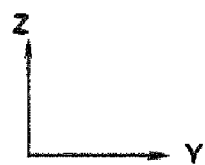

In preparation for the detailed description of the invention based on the description of the control apparatus and its operation, some general statements are first made and definitions are given with reference to FIGS. 4a through 8:

FIG. 4a shows a schematic side view of a car and the associated coordinates, namely the longitudinal direction X and the vertical direction Z, FIG. 4b shows the car shown in FIG. 4a in a plan view and also the associated coordinates, namely the longitudinal direction X and the transverse direction Y, FIG. 4c shows the car of FIGS. 4a and 4b in a rear view and the associated coordinates, namely the transverse direction Y and the vertical direction Z.

Figure 5:
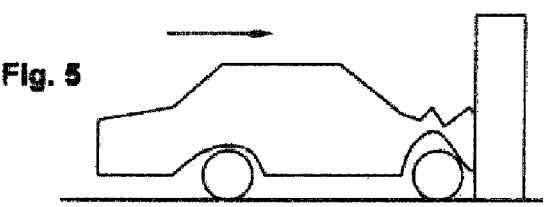
FIG. 5 shows the car in the representation of FIG. 4a in a head-on collision.
Figure 6:
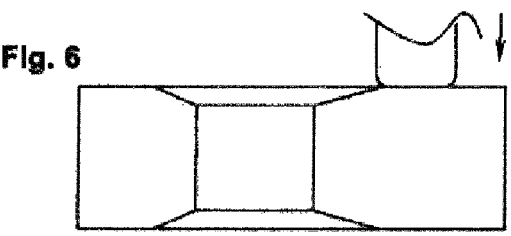
FIG. 6 shows the car in the representation of FIG. 4b in a side collision.

FIG. 5 shows a typical frontal crash. Here the velocity changes in the X direction, i.e. the second derivative of the X coordinate with respect to time is not equal to 0: $d^2X/dt^2 \neq 0$ and the magnitude of the acceleration in the X direction and thus also in the XY plane is greater than 0: $|a_{XY}|>0$. Accordingly, in the case of a lateral impact (FIG. 6), the second derivative of the Y coordinate with respect to time is not equal to 0: $d^2Y/dt^2 \neq 0$; here, too, the magnitude of the acceleration in the XY plane is greater than 0: $|a_{XY}|>0$. This means that one criterion for locking the strap is that the amount of acceleration in the XY plane exceeds a predetermined limit.

Figure 7:
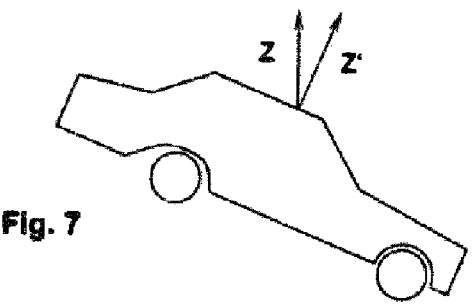
FIG. 7 shows the car in a representation of FIG. 4a when tilted about the Y-axis.
Figure 8:
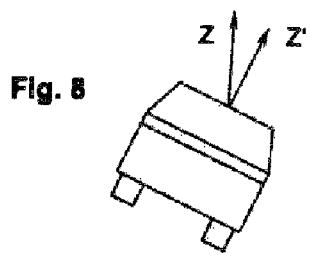
FIG. 8 shows the car in a representation of FIG. 4c when tilted about the X-axis.

FIGS. 7 and 8 show a different scenario that must result in the locking of the strap, namely a tipping of the vehicle. Tilting of the vehicle always means that the Z coordinate of the vehicle (referred to here as Z') is inclined with respect to the vertical direction Z. The locking criterion here should be that the inclination—which can be expressed by the angle ΔZ included between Z and Z'—exceeds a predetermined value. The dynamics (i.e. the velocity or acceleration of the change) is not important here, nor is the direction, so an amount of ΔZ can be set as the limit for locking.

In the preferred embodiment described below, all relevant orientation and acceleration data are measured by a common sensor apparatus, but processed separately by a switching apparatus downstream of this sensor apparatus. This is first explained using a schematic circuit diagram. It should be emphasized that this schematic is only one possibility. The corresponding separation of the information can also be done differently in terms of sound technology or software.

Figure 9A:
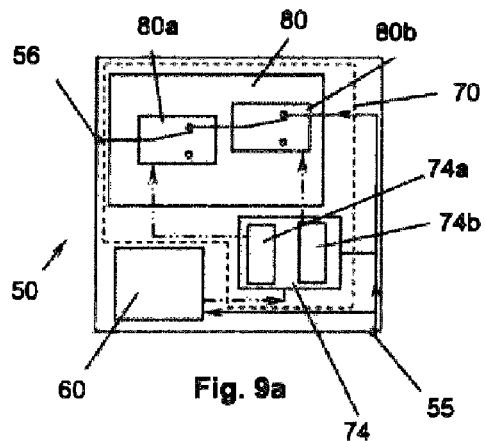
FIG. 9a shows a more detailed representation of an embodiment of a control apparatus as simplified in FIGS. 1 and 3, wherein it is in its release state.

FIG. 9a shows a schematic embodiment of a control apparatus 50. This control apparatus 50 may be designed as a control unit containing all relevant components; however, it is also possible for individual elements of the control apparatus to be "distributed over the vehicle", although this is not generally preferred.

As this has already been mentioned, the control apparatus 50 is used to control, i.e. enable and interrupt, the flow of current from the on-board power supply to the electromagnet 42. It therefore has a power input 55 connected to the vehicle electrical system and a power output 56 connected to the solenoid, with a switching unit 80 arranged therebetween. In the closed state of the switching unit, current from the vehicle electrical system flows through the electromagnet; in the open state of the switching unit 80, it does not. At this location, it should also be mentioned that a DC-DC converter acting as a constant current source could be provided to supply the solenoid with only as much current as it requires when the switching unit is in the closed state. This could also be designed with two stages so that it provides an inrush current and a lower holding current. However, this is not represented in detail below.

In addition to the switching unit 80 just mentioned, the control apparatus 50 has a sensor apparatus 60 and a logic unit 74. This logic unit 74 and the switching unit 80 together form the switching device 70.

In the preferred embodiment shown, the sensor apparatus 60 (which could also be referred to simply as a sensor) is a triaxial sensor that continuously measures orientation and acceleration in all three spatial directions and relays the measured data to the switching apparatus 70. This switching apparatus, as just mentioned, consists at least functionally of the logic unit 74 and the switching unit 80.

The data provided by the sensor apparatus 60 is processed by the logic unit 74 in two separate operations: In one process, only the acceleration in the XY plane is processed, and in another the tilting about the Z axis is processed, which is why the logic unit 74 has, at least functionally, a first logic subunit 74a, which handles the acceleration evaluation in the XY plane, and a second logic subunit 74b, which handles the tilt evaluation. In the embodiment shown, these two logic subunits 74a and 74b control two switches 80a, 80b connected in series, which in turn form the switching unit 80. This embodiment of the switching unit is chosen in particular for the purpose of illustrative representation, but could also be designed in this manner in practice.

As described above, the currentless state of the solenoid 42 is the locked state of the belt retractor 10 (FIG. 1), while the energized state is the unlocked state.

Figure 9B:
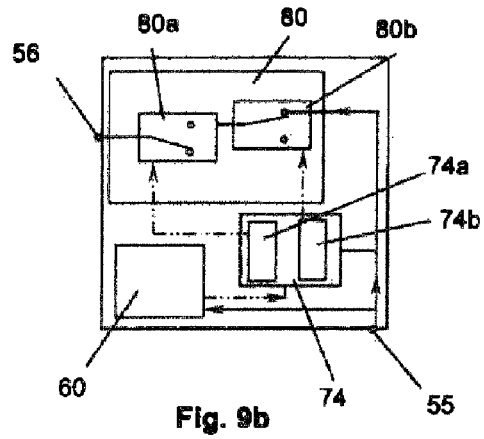
FIG. 9b shows the control apparatus of FIG. 9a, wherein it is in its first emergency state.
Figure 9C:
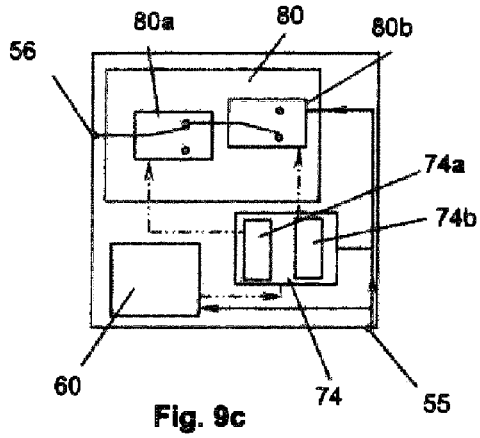
FIG. 9c shows the control apparatus of FIG. 9a wherein it is in its second emergency state.

As this was just mentioned, the logic unit 74 has a first logic subunit 74a which evaluates the acceleration values in the XY plane and a second logic subunit 74b which evaluates the tilt values ΔZ. Of course, the unlocked release state (the energized state of the solenoid) is to be present only when both logic subunits 74a, 74b come to the result "unlock". In terms of circuitry, this is implemented here in such a way that the first logic subunit 74a actuates the first switch 80a of the switching unit 80 and the second logic subunit 74b actuates the second switch 80b of the switching unit 80. Since these two switches 80a, 80b are connected in series, both switches 80a, 80b must be in the flow-through position, i.e., closed (FIG. 8a), to produce the unlocked state (enable state). In all other cases (FIGS. 9b to 9d), a locked state (emergency state) is present. This circuit thus forms a logical AND with regard to the unlocked state.

Figure 10:
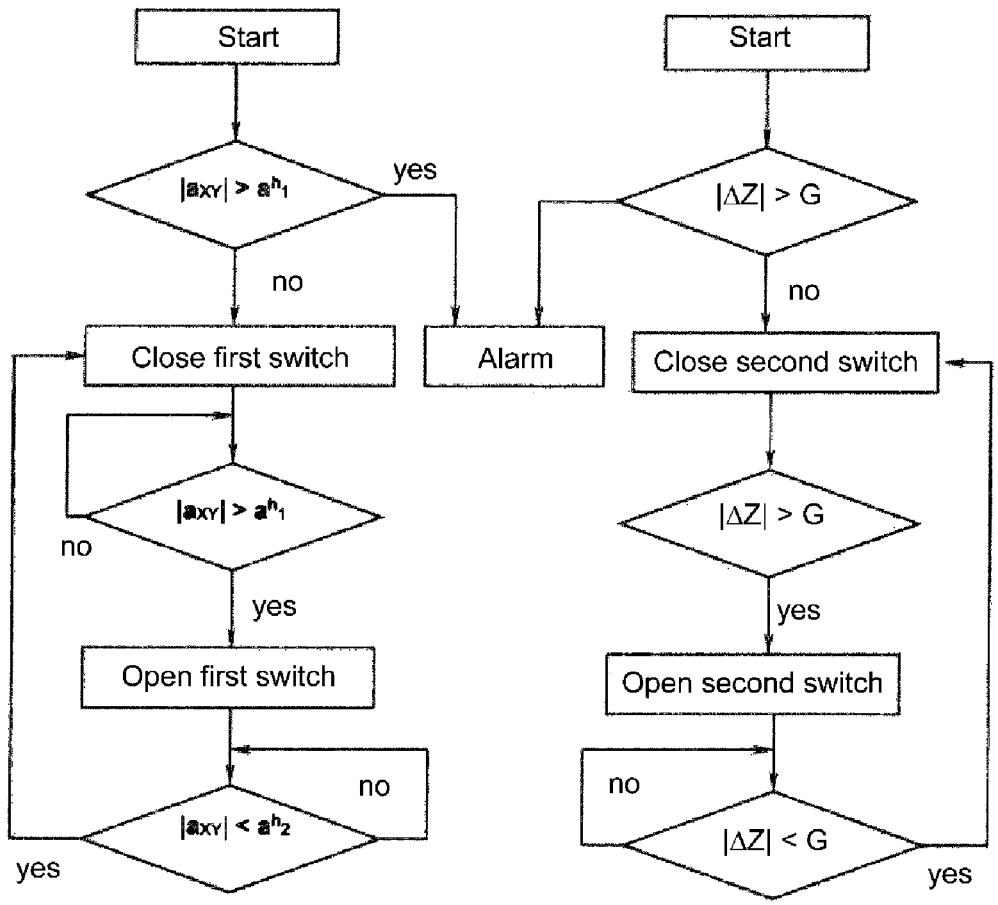
FIG. 10 shows a flowchart of a first preferred control sequence of the logic unit.

With reference to FIG. 10, a first algorithm according to the invention, which is performed by the logic unit 74, is now described. As indicated above, the two logic subunits 74a and 74b operate in parallel and preferably independently of one another. In the flowchart of FIG. 10, the left tree shows the flowchart of the first logic subunit 74a and the right tree shows the flowchart of the second logic subunit 74b. The relevant measured variable for the first logic subunit 74a is the magnitude of the acceleration in the XY plane, i.e. the horizontal acceleration $|a_{XY}|$. The procedure is as follows:

After starting the vehicle, the first step can be to check whether the amount of acceleration in the XY plane $|a_{XY}|$ is less than a first limit value $a^h_1$. Since the vehicle should be at this state, an alarm can be triggered, for example, if the acceleration value is greater than this limit, as this indicates that there is either a technical defect or a very unusual situation. If, on the other hand, the magnitude of the acceleration value is below the first limit value $a^h_1$, the first logic subunit 74a controls the first switch 80a so that it switches to its closed state corresponding to FIG. 9a.

The review just described is performed on an ongoing basis. As long as the amount of acceleration in the XY plane does not exceed the first limit $a^h_1$, the first switch 80a remains closed. However, if the first limit $a^h_1$ is exceeded, the first switch 80a is opened and the first emergency state is present, which means that due to an acceleration in the XY plane, the electromagnet 42 is currentless and thus the belt coil 20 is locked against the housing 12. The step according to the invention now follows: After the switch has been opened, the first logic subunit 74a now checks whether the amount of acceleration in the XY plane $|a_{XY}|$ falls below a second limit value $a^h_2$, wherein this second limit $a^h_2$ is smaller than the first limit $a^h_1$. As long as this is not the case, the first switch 80a remains closed and thus the first emergency state is maintained. Only when the magnitude of the acceleration in the XY plane $|a_{XY}|$ also falls below this second limit $a^h_2$, the first switch 80a is closed again and the first emergency condition is no longer present. Preferably, the second limit $a^h_2$ is between 20% and 80% of the first limit $a^h_1$.

Figure 11A:
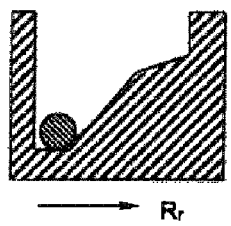
FIGS. 11a and 11b show a schematic diagram of a mechanical analog of the left branch of the control sequence shown in FIG. 10.
Figure 11B:

The mechanical analog is shown in FIGS. 11a and 11b: to move the ball from its minimum, the force acting on it in the radial direction $R_r$ must exceed a first limit so that it can climb the steeper ramp. It then moves onto a flatter ramp so that it remains there while applying a lower holding force acting in the radial direction. Only when this falls below a second limit value, which is smaller than the first limit value, can the ball return to its starting position.

Parallel to what has just been described, the second logic subunit 74b permanently checks the amount of tilt of the vehicle $|\Delta Z|$. Here, too, it can first be checked after the start whether $|\Delta Z|$ exceeds a limit value G. If this is already the case at the start of the vehicle, an unusual state or a technical defect must also be assumed here. If, on the other hand, $|\Delta Z|$ is smaller than the limit value G, the second switch 80b is also closed and the belt retractor unit as a whole is in its release state (FIG. 9a).

Figure 9D:
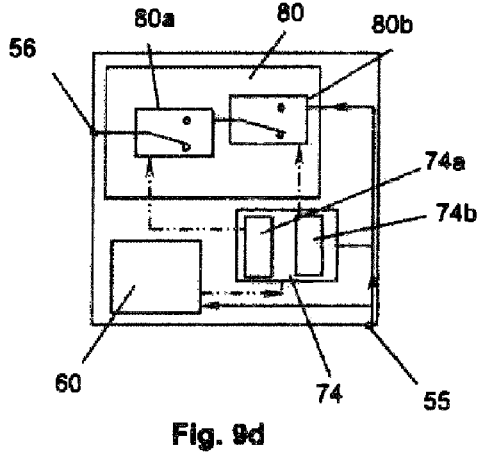
FIG. 9d shows the control apparatus of FIG. 9a, wherein it is in a dual emergency state.

The check to see if $|\Delta Z|$ exceeds the limit G is also performed continuously. As long as this limit is not exceeded, the second switch 80b remains closed, but if it is exceeded, the second switch 80b is opened and the belt retractor unit is then in its second emergency state in accordance with the definitions made herein. Depending on whether the first emergency state is also present at the same time (which may or may not be the case), either the switching state of FIG. 9c or the switching state of FIG. 9d is present. Due to the AND circuit, however, the enable state (FIG. 9a) is only present if both emergency states are not present.

If $|\Delta Z|$ falls below the limit G again, the second switch is closed again. Hysteresis is not necessary here, but would also be possible.

Figure 12:
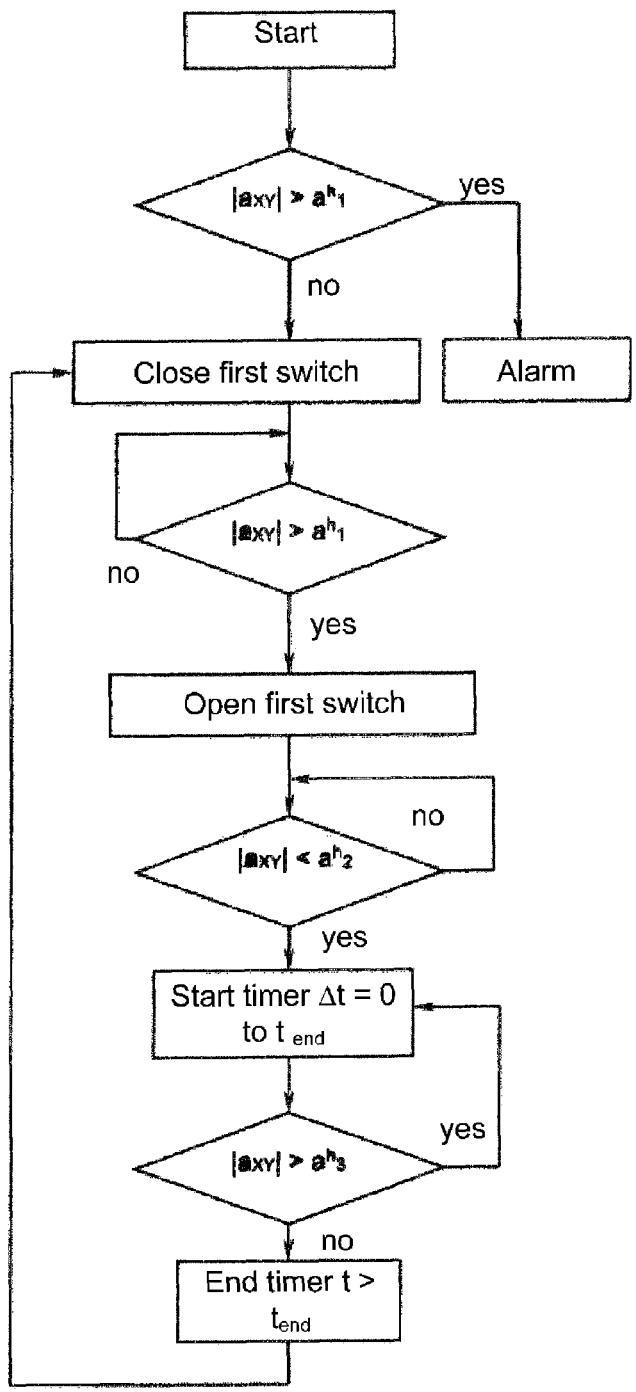
FIG. 12 shows a flowchart of a second preferred control sequence of the first logic subunit.

FIG. 12 shows a second embodiment of the left flowchart, i.e., the operation of the first logic subunit 54a:

As can be seen, the function sequence is initially identical to the one described above, but after the second limit $a^h_2$ is fallen below, another step follows before the first switch 80a is closed again. In fact, a timer is started and during a selected time interval $\Delta t$, of, for example, 500 or 1,000 ms, it is continuously checked whether the magnitude of the acceleration in the XY plane $|a_{XY}|$ exceeds a third limit $a^h_3$. This third limit $a^h_2$ may be identical to the first limit $a^h_1$ but also lie between the first limit $a^h_1$ and the second limit $a^h_2$. As soon as a corresponding exceedance of the third limit $a^h_3$ is detected, the time interval starts over again. Only when no exceeding of the third limit $a^h_3$ occurs in a continuous time interval $\Delta t$, the first switch is closed again, so that the belt retractor unit leaves its first emergency state again.

With the measures described, it is achieved that a large number of switching cycles are avoided despite low limit values for the locking of the belt reel.

While the above description constitutes the preferred embodiment of the present invention, it will be appreciated that the invention is susceptible to modification, variation and change without departing from the proper scope and fair meaning of the accompanying claims.

The invention claimed is:

1. A belt retractor unit, comprising:
   a housing,
   a belt reel rotatably mounted in the housing,
   a blocking unit for blocking the belt reel against the housing, wherein the blocking unit has an electrically actuatable actuator unit,
   a control device for actuating the actuator unit, which has a sensor device for continuously measuring at least one horizontal acceleration value and a switching device for actuating the actuator unit depending on at least the at least one horizontal acceleration value,
   wherein
   the belt retractor unit has a first emergency state in which the magnitude of the at least one horizontal acceleration value is above a first limit value and in which the belt reel is blocked against the housing, and a release state in which the magnitude of the at least one horizontal acceleration value is below the first limit value and in which the belt reel is not blocked against the housing,
   wherein the belt retractor unit does not transition from the first emergency state into the release state as long as the magnitude of the at least one horizontal acceleration value has not dropped below a second limit value which is less than the first limit value, wherein, starting from the first emergency state, the belt retractor unit changes to the release state when the magnitude of the at least one horizontal acceleration value does not exceed a third limit value again for at least a period of 250 ms, and wherein the third limit value is greater than the second limit value and is less than or equal to the first limit value.

2. The belt retractor unit according to claim 1, wherein, starting from the first emergency state, the belt retractor unit changes to the release state when the magnitude of the at least one horizontal acceleration value does not exceed a third limit value again for at least a period of 500 ms.

3. The belt retractor unit according to claim 1, wherein the sensor device furthermore measures an inclination angle of the sensor device against the vertical axis and transmits it to the switching device.

4. The belt retractor unit according to claim 3, wherein the belt retractor unit has a second emergency state in which the inclination exceeds an inclination limit and in which the belt reel is blocked against the housing.

5. The belt retractor unit according to claim 4, wherein the second emergency state is independent of the magnitude of the at least one horizontal acceleration value.

6. The belt retractor unit according to claim 1, wherein the sensor device has a 3-axis sensor.

* * * * *